US012707496B2

(12) United States Patent
Dong

(10) Patent No.: US 12,707,496 B2
(45) Date of Patent: Aug. 11, 2026

(54) METHOD AND APPARATUS FOR COMMUNICATING THROUGH MULTI LINKS

(71) Applicant: BEIJING XIAOMI MOBILE SOFTWARE CO., LTD., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 297 days.

(21) Appl. No.: 18/283,934

(22) PCT Filed: Mar. 25, 2021

(86) PCT No.: PCT/CN2021/083096
§ 371 (c)(1),
(2) Date: Sep. 25, 2023

(87) PCT Pub. No.: WO2022/198596
PCT Pub. Date: Sep. 29, 2022

(65) Prior Publication Data

US 2024/0057158 A1 Feb. 15, 2024

(51) Int. Cl.
*H04W 74/0808* (2024.01)
*H04W 84/12* (2009.01)

(52) U.S. Cl.
CPC ........ *H04W 74/0808* (2013.01); *H04W 84/12* (2013.01)

(58) Field of Classification Search
CPC ............. H04W 74/0808; H04W 84/12; H04W 52/0216; H04L 5/0078
See application file for complete search history.

(56) References Cited

U.S. PATENT DOCUMENTS

2021/0185607 A1* 6/2021 Cariou .............. H04W 52/0216
2021/0385006 A1* 12/2021 Ryu ...................... H04L 5/0098
2021/0385692 A1* 12/2021 Kwon .................. H04W 28/24

FOREIGN PATENT DOCUMENTS

CN 112188644 A 1/2021
WO WO 2021004382 A1 1/2021

OTHER PUBLICATIONS

PCT/CN2021/083096, International Search Report dated Jan. 5, 2022, 2 pages.
Huawei, Ming, G. “PDT mac mlo power save listen interval” May 2021 doc.: IEEE 802.11-21/0082r2, 5 pages.
European Patent Application No. 21932221.1, Search and Opinion dated Jan. 8, 2025, 15 pages.

* cited by examiner

*Primary Examiner* — Mohammad S Anwar
(74) *Attorney, Agent, or Firm* — Cozen O’Connor

(57) ABSTRACT

A method for communicating under multi links includes: determining a first message frame; and sending the first message frame under the first link in the multi links. The first message frame includes first information. The first information is configured to indicate listen interval information of a station corresponding to at least one link in multi links, and the listen interval information is configured to define a time interval for the station to awake for a communication operation.

19 Claims, 4 Drawing Sheets

METHOD AND APPARATUS FOR COMMUNICATING THROUGH MULTI LINKS

CROSS REFERENCE TO RELATED APPLICATIONS

This application is a national phase application based on International Application No. PCT/CN2021/083096, filed Mar. 25, 2021, the entire content of which is incorporated herein by reference.

TECHNICAL FIELD

The present disclosure relates to the field of wireless communication technologies, more particularly, to a method and an apparatus for communicating through multi links.

BACKGROUND

Current research in Wi-Fi technology includes 320 MHz bandwidth transmission, aggregation and coordination for multi frequency bands, among others. The Wi-Fi technology is expected to improve the speed and a throughput by at least four multiples as compared to existing standards. Main application scenarios of the Wi-Fi technology include, for example, video transmission, AR (Augmented Reality), VR (Virtual Reality).

Aggregation and coordination for multi frequency bands refer to the situation in which communication is performed simultaneously in frequency bands, such as 2.4 GHz, 5 GHz, and 6-7 GHz, between devices, and a new MAC (Media Access Control) mechanism is required be defined for managing the communication simultaneously in multi frequency bands between devices. In addition, it is expected that the aggregation and coordination for multi frequency bands can support low latency transmission.

SUMMARY

According to an embodiment of the present disclosure, there is provided a method for communicating under multi links. The method may be applicable for a station supporting multi links, and may include: determining a first message frame including first information, in which, the first information is configured to indicate listen interval information of a station corresponding to at least one link in multi links, and the listen interval information is configured to define a time interval for the station to awake for a communication operation; and sending the first message frame under the first link in the multi links.

According to an embodiment of the present disclosure, there is provided a method for communicating under multi links. The method may be applicable for an access point supporting multi links, and may include: receiving a first message frame including first information, in which, the first information is configured to indicate listen interval information of a station corresponding to at least one link in multi links, and the listen interval information is configured to define a time interval for the station to awake for a communication operation; and executing the communication operation based on the first message frame.

According to an embodiment of the present disclosure, there is provided an electronic device. The electronic device includes a memory, a processor, and d a computer program stored on the memory and operable on the processor. When executing the computer program, the processor is configured to: determine a first message frame including first information, in which, the first information is configured to indicate listen interval information of a station corresponding to at least one link in multi links, and the listen interval information is configured to define a time interval for the station to awake for a communication operation; and send the first message frame under the first link in the multi links.

BRIEF DESCRIPTION OF THE DRAWINGS

Illustrative embodiments of the present disclosure are described in detail with reference to the accompanying drawings. The above and other features of embodiments of the present disclosure will be more obvious, in which.

DETAILED DESCRIPTION

Figure 1:
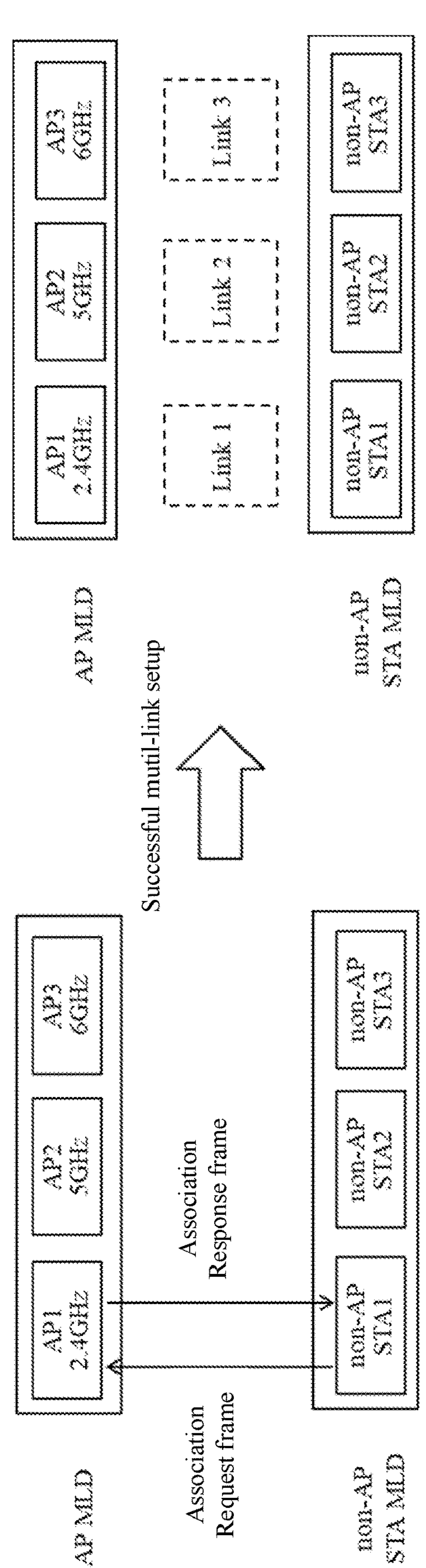
FIG. 1 is schematic diagram illustrating setting up of multi links according to an illustrative embodiment.

The following description will be provided with reference to the accompanying drawings to assist in a comprehensive understanding of various embodiments of the present disclosure limited by the appended claims and their equivalents. Embodiments of the present disclosure herein include various specific details, but these specific details are only considered illustrative. In addition, for clarity and conciseness, descriptions of well-known technologies, functions, and constructions can be omitted.

The terms and expressions used in the present disclosure are not limited to written meanings, and are only used by inventors to enable a clear and consistent understanding of the present disclosure. Therefore, for those skilled in the art, description of various embodiments in the present disclosure is provided for illustrative purposes only, and not for limiting purposes.

It should be understood that unless context clearly indicates otherwise, singular forms "a", "an", "said", and "the" used herein can also include plural forms. It should be further understood that the term "including" used in the present disclosure refers to presence of the described features, integers, steps, operations, elements, and/or components, but does not exclude presence or adding of one or more other features, integers, steps, operations, elements, components, and/or their groups.

It will be understood that although the terms "first", "second", etc. can be used to describe various elements in the disclosure, these elements should not be limited by these terms. These terms are only used to distinguish one element from another. Therefore, without departing from the teachings of illustrative embodiments, a first element discussed below can be referred to as a second element.

It should be understood that when a component is referred to as "connected" or "coupled" to another component, the component can be directly connected or coupled to other components, or can exist an intermediate component with other components. In addition, the term "connected" or "coupled" used herein may include wireless connected or wireless coupled. The term "and/or" or the expression "at least one/at least one of . . . " used herein includes any and all combinations of one or more related listed items.

Unless otherwise defined, all terms used herein (including technical and scientific terms) have meanings same as those generally understood by ordinary skilled person in the art to which the present disclosure belongs.

At present, the aggregation and coordination for multi frequency bands technology may support a maximum bandwidth of 320 MHz (160 MHz+160 MHz), and may also support 240 MHz (160 MHz+80 MHz) and other bandwidths.

In the present art, stations (STAs) and access points (APs) can be multi-link devices (MLDs), which support a function of sending and/or receiving simultaneously under multi links at a same time point. Therefore, in the present art, there can be multi links between the STAs and the APs, and research is underway on communication under multi links between the two types of devices.

In existing art, the stations may periodically awake to listen for beacon frames broadcasted by the access points in order to save power. For example, a listen interval may be negotiated during a process of setting up an association or a re-association between a station and an access point. However, the existing negotiation mechanism for the listen interval is only applicable for single link communication between stations and access points, and is not applicable for communication under multi links.

FIG. 1 is schematic diagram illustrating setting up of multi links according to an illustrative embodiment.

In a wireless local area network, one basic service set (BSS) may be composed of an access point (AP) and one or more stations (STA) communicating with the AP. One basic service set may be connected to a distribution system (DS) through its AP, and then accessed to another basic service set to form an extended service set (ESS).

The AP is a wireless switcher used in a wireless network and is also a core of the wireless network. The AP device may be used as a wireless base station, mainly as a bridge to connect the wireless network and a wired network. By utilizing this type of AP, the wired network and the wireless network can be integrated.

The AP can include a software application and/or a circuit to enable other types of nodes in the wireless network to communicate with both external and internal wireless networks through the AP. In some examples, illustratively, the AP may be a terminal device or a network device configured with a Wi Fi (Wireless Fidelity) chip.

Illustratively, the station (STA) may include, but is not limited to, a cellular phone, a smart phone, a wearable device, a computer, a personal digital assistant (PDA), a personal communication system (PCS) device, a personal information manager (PIM), a personal navigation devices (PND), a global positioning system, a multimedia device, or an Internet of Things (IoT) device, etc.

In an illustrative embodiment of the present disclosure, the AP and the STA may be a device supporting multi links, for example, represented as AP MILD and non-AP STA MILD, respectively. For convenience of description, the following mainly describes an example of communication under multi links between one AP MLD and one non-AP STA MLD. However, illustrative embodiments of the present disclosure are not limited to this embodiment.

In FIG. 1, as an example only, the AP MILD may represent an access point supporting a multi-link communication function, while the non-AP STA MILD may represent a station supporting a multi-link communication function. Referring to FIG. 1, the AP MLD may include three APs operating in different frequency bands, such as AP1 operating in a 2.4 GHz frequency band, AP2 operating in a 5 GHz frequency band, and AP3 operating in a 6 GHz frequency band. The non-AP STA MLD may include three STAs corresponding to three APs, such as non-AP STA1, non-AP STA2, and non-AP STA3. The non-AP STA MILD may complete a process of setting up/re-setting up multi links between the non-AP STA MILD and the AP MILD by sending an association request frame or a re-association request frame and receiving an association response frame or a re-association response frames under one link (such as a link corresponding to 2.4 GH as illustrated in FIG. 1). As illustrated in FIG. 1, setting up of three links may be completed under one link. In other words, when setting up of multi links is completed, the AP1 communicates with the non-AP STA1 through a corresponding first link Link 1. Similarly, the AP2 and the AP3 communicate with the non-AP STA2 and the non-AP STA3 through a second link Link 2 and a third link Link 3, respectively. It should be understood that a communication scenario shown in FIG. 1 is only illustrative, and the concept of the present disclosure is not limited to this communication scenario. For example, the setting up of multi links between the non-AP STA MLD and the AP MLD may be achieved through transmission of other frames. For example, the AP MILD can further include other APs operating in other frequency bands, or the AP MLD may be connected to a plurality of non-AP STA MLDs, or the AP may communicate with a plurality of other types of stations.

When an STA on a corresponding link in the non-AP STA MILD is in an awakening state, the STA may communicate under this link, for example, perform frame switching. In order to achieve power saving for the non-AP STA MILD, each STA in the non-AP STA MILD (such as non-AP STA1, non-AP STA2, and non-AP STA3 shown in FIG. 1) may have its own power management mode and power status under a corresponding link. Therefore, in a multi-link communication environment, it is required to negotiate a listen interval (LI) for each link in multi links during a process of setting up multi links.

Figure 2:
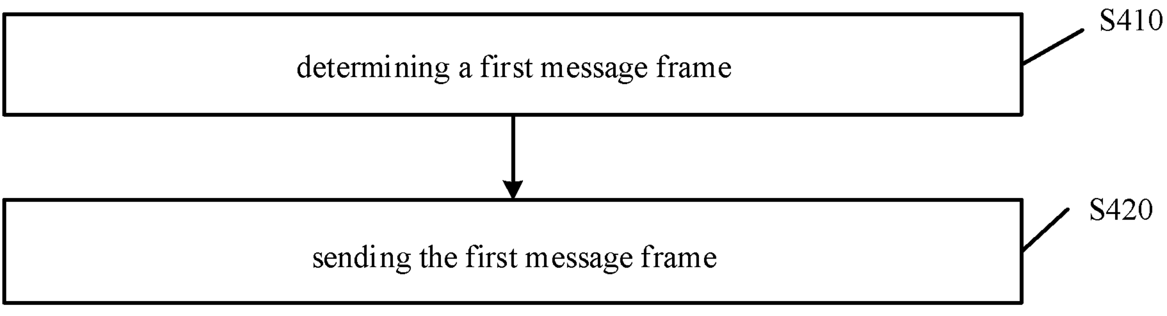
FIG. 2 is a flowchart illustrating a communication method according to an embodiment.

FIG. 2 is a flowchart illustrating a communication method according to an embodiment. The communication method illustrated in FIG. 2 may be applicable for a station supporting multi links.

As illustrated in FIG. 2, at step 210, a first message frame may be determined. The first message frame may at least include first information. According to an embodiment, the first information may be configured to indicate listen interval information of a station corresponding to at least one link in multi links. The listen interval information is configured to define a time interval for the station to awake for a communication operation. According to an embodiment, multi links can be multi links set up between non-AP STA MLD and AP MLD, such as Link 1 to Link 3 as illustrated in FIG. 1. The first information and the listen interval information will be described in detail later with reference to Tables 1 to 3 and FIG. 3 in the following.

According to an embodiment, the first message frame may be an association request frame or a re-association request frame. For convenience of description, the following description takes the association request frame used as the first message frame as an example. However, the present disclosure is not limited to this example, and the first message frame may be other types of frames.

In an embodiment of the present disclosure, there are many manners to determine the first message frame, such as generating the first message frame based on at least one of following conditions: a network condition, a load condition, a hardware capability of a sending/receiving device, a service type, and a relevant protocol specification, which will not make specific limitations in embodiments of the present disclosure. In embodiments of the present disclosure, the first message frame may also be obtained from an external device, which will not make specific limitations in embodiments of the present disclosure.

At step S220. the first message frame may be sent under the first link in the multi links. With sending the first message frame carrying the listen interval information, the non-AP STA MLD may notify the AP MLD of the listen interval for each station. In addition, an operation of determining the first message frame in step 210 above may be performed under the first link, or under other links different from the first link.

In embodiments of the present disclosure, the first information for indicating the listen interval information and carried by the first message frame sent under the first link may be at an MLD level.

More specifically, the first information for indicating the listen interval information and carried by the first message frame may include a listen interval field. The listen interval field may indicate listen interval information of a station corresponding to the first link. In addition, the listen interval field may further indicate listen interval information of stations corresponding to other links different from the first link in the multi links. For the MLD level, the listen interval field carried by the first message frame may not only identify the listen interval information under the present link (the first link), but also identify the listen interval information under other links at the same time. That is, respective STAs supported by non-AP STA MLD may awake for communication based on the same listen interval.

As an example only, the first message frame may have a format shown in Table 1 below.

TABLE 1

| association request frame (first message frame) body | |
|---|---|
| order | Information |
| 1 | Capability Information |
| 2 | Listen Interval |
| 3 | SSID |
| 4 | Supported Rates and BSS Membership Seletors |
| . . . | . . . |

In Table 1, the above listen interval field may be a field represented with an order number 3 in the associated request frame (first message frame) body, which is used to identify a time value of the listen interval. It will be understood that the content shown in Table 1 is only an illustrative example and not a limitation to the present disclosure. According to an embodiment, time intervals for stations to awake defined by the listen interval information may be one or more offset values relative to a same timing point (e.g., $T_1=T_0+\delta_1$, $T_2=T_0+\delta_2$ . . . , where $T_1$ and $T_2$ are awakening time points of the stations, and $T_0$ is the same timing point, $\delta_1$, $\delta_2$ are the offset values), or one or more offset values relative to the previous awakening time point (e.g., $T_1=T_0+\delta_1$, $T_2=T_0+\delta_2$ . . . ), or a time period value of periodic awakening. It can be understood that each element in Table 1 exists independently, and these elements are illustratively listed in the same table, but it does not mean that all elements in the table exist simultaneously as shown in the table. A value of each element is independent of a value of any other element in Table 1. Therefore, those skilled in the art can understand that the value of each element in Table 1 is taken in an independent embodiment. These elements in Table 3 may also be freely combined to form an embodiment.

According to an embodiment, the listen interval information may be a multiple of a maximum value in beacon frame broadcast periods of associated access points, the associated access points being set up, under the multi links, by the station supporting multi links. For example, a multiple of a maximum value in beacon intervals (BIs) of a plurality of the APs supported by AP MLD may be selected as a listen interval indicated by the listen interval field. That is, the listen interval field of the first message frame shown in Table 1 may include a multiple of this maximum value, for example, the multiple may be 1 or 2 or other numbers. As an example, description is made in combination with FIG. 1, for example, a BI of AP1 is 100 ms, a BI of AP2 is 200 ms, and a BI of AP3 is 300 ms, then a multiple of the maximum value of 300 ms (i.e., the BI of AP3) is selected as the listen interval. Of course, this multiple may be a positive integer or any other number.

In another embodiment of the present disclosure, the first information for indicating the listen interval information and carried by the first message frame sent under the first link may be at a link level. For the link level, a power saving management mode of the plurality of STAs supported by non-AP STA MLD is independent of each other, and the listen interval information of the STA corresponding to each link in the multi links may be carried in the first message frame.

More specifically, the first information for indicating the listen interval information and carried in the first message frame may include a listen interval field and a multi-link information element.

According to an embodiment, the listen interval field may indicate the listen interval information of the station corresponding to the first link (the present link) for sending the first message frame. The listen interval field can be included in the first message frame (the association request frame or the re-association request frame) in a form similar to that shown in Table 1. For simplicity, repeated descriptions are omitted herein.

According to an embodiment, the multi-link information element may include listen interval information of stations corresponding to other links different from the first link in the multi links. For example, the multi-link information element may include listen interval information of a station corresponding to each of other link. Due to a fact that the multi-link information element can inform the other party of information belonging to a same multi-link device during a process of setting up/re-setting up multi links, the LI information element under each link may be included in the multi-link information element.

As an example, the situation at link level may be described in combination with FIG. 1. In a case where the first link for sending the first message frame is Link 1, the listen interval field in the first message frame may indicate a listen interval of non-AP STA1 corresponding to this link (Link 1), and the multi-link information element may include listen intervals of stations non-AP STA2 and non-AP STA3 corresponding to other links Link 2 and Link 3.

In an embodiment of the present disclosure, the listen interval information corresponding to each of other links may be carried in the multi-link information element in a format of an information element. That is, the listen interval information element (LI element) may be carried in the multi-link information element. As an example, the listen interval information element may have a format shown in Table 2 below.

TABLE 2 listen interval information element (LI element) format

| | Element ID | Length | Element ID Extension | Information |
|---|---|---|---|---|
| Octets: | 1 | 1 | 0 or 1 | variable |

In Table 2, Element ID is set as a specific value to identify the LI information element, Length represents length information of the LI information element, and information field represents a listen interval, which may have, for example, 16 bits. In addition, although the LI information element in Table 2 shows the Element ID Extension, the LI information element may additionally not include the Element ID Extension. According to an embodiment, the time interval for each of other stations to awake which is defined by the listen interval information element (such as the information field in Table 2) can be an offset value relative to the same timing point, or an offset value relative to the previous awakening time point, or a periodic awakening time period value. It can be understood that each element in Table 2 exists independently, and these elements are illustratively listed in the same table, but it does not mean that all elements in the table exist simultaneously as shown in the table. A value of each element is independent of a value of any other element in Table 2. Therefore, those skilled in the art may understand that the value of each element in Table 3 is taken in an independent embodiment. These elements in Table 2 may also be freely combined to form an embodiment.

According to an embodiment, the multi-link information element may include both the listen interval information for indicating the station corresponding to the first link (this link) that sends the first message frame, as well as the listen interval information of the stations corresponding to other links different from the first link in the multi links. That is, the two implementations mentioned above can be used together.

In an embodiment of the present disclosure, the first message frame may include at least first information. The first information may be configured to indicate the listen interval information of the station corresponding to the at least one link in multi links, and the at least one link may be a link for transmitting the first message frame. Alternatively, the first message frame may include at least the first information. The first information may be configured to indicate the listen interval information of the station corresponding to the at least one link in multi links. The first message includes one or more pieces of listen interval information, as well as the link corresponding to each piece of listen interval information. One piece of listen interval information may correspond to one or more links. In this way, the first message may be used to configure listen the interval information of the corresponding link.

According to an embodiment, the multi-link information element may further include a first identifier. The first identifier may indicate that a link information field of the multi-link information element includes the listen interval information of the stations corresponding to other links. In other words, when receiving the first message frame, the access point may determine that the multi-link information element includes the listen interval information of the stations corresponding to other links through the first identifier, such that the multi-link information element may continue to be parsed to obtain the listen interval information under other links.

As an example, the multi-link information element may have a format shown in Table 3 below.

TABLE 3 multi-link information element (multi-link element)

| | Element ID | Length | Element ID Extension | Multi-Link Control | Common Info | Link Info |
|---|---|---|---|---|---|---|
| Octets: | 1 | 1 | 1 | 2 | variable | variable |

Referring to Table 3, the multi-link information element may include: Element ID, Length, and Element ID Extension. In addition, the multi-link information element may further include: a multi-link control field, a common information field, and a link information field. It can be understood that each element in Table 3 exists independently, and these elements are illustratively listed in the same table, but it does not mean that all elements in the table exist simultaneously as shown in the table. A value of each element is independent of a value of any other element in Table 3. Therefore, those skilled in the art may understand that the value of each element in Table 3 may be taken in an independent embodiment. These elements in Table 3 may also be freely combined to form an embodiment.

In an embodiment of the present disclosure, the first identifier mentioned above may be a bit (for example, one bit) in a multi-link control field, or a common information field. When the bit in the first identifier is set as a specific value, it may indicate that the link information field includes the LI information element corresponding to each of other links (as shown in Table 2).

Figure 3:
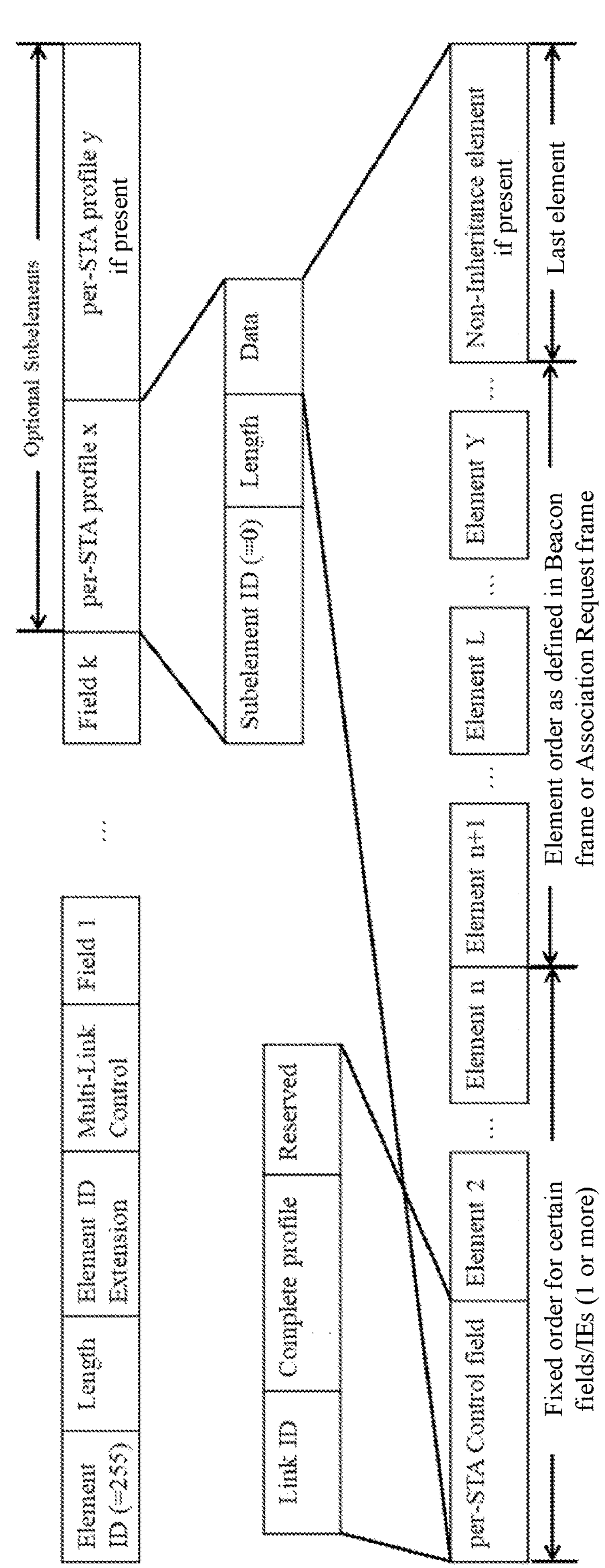
FIG. 3 is a detailed schematic diagram illustrating a multi-link information element according to an embodiment.

According to an embodiment, the link information field may include optional sub elements, and the detailed content of the optional sub elements may be shown in FIG. 3. It can be understood that respective contents included in Tables 1 to 3 and FIG. 3 exist independently. Although these contents are illustratively listed in the same table, it does not mean that all contents in the table exist simultaneously as shown in the table. A value of each element is independent of a value of any other element in the table. Therefore, those skilled in the art can understand that the value of each of the contents included in the tables and figures in the present disclosure is taken in an independent embodiment. These contents may be freely combined to form one embodiment.

Referring to FIG. 3, the optional sub elements of the link information field may include a per-station profile field (such as per-STA profile x and per-STA profile y in FIG. 3). The per-station profile field may include a sub element identifier, a length, and data. The data field can include a per-station control field (per-STA control field) and an element (such as Element 2). The per-station control field may include a link ID, a complete profile sub field, and a reserved field.

In an embodiment of the present disclosure, the first identifier mentioned above may be a bit in the per-STA control field (for example, the reserved field may be set as the first identifier), or a bit in a complete profile sub field (complete profile). When the bit of the first identified is set as a specific value, it may indicate that the link information field includes the LI information element corresponding to each of other links (as shown in Table 2). For example, the LI information element may be included in an element of FIG. 3 (Element 2, etc.), in which case the link ID may represent a link corresponding to the LI information element.

That is, for the link level, the listen interval field in the first message frame may be used to identify the listen interval under the present link (first link) for sending the first message frame. The first identifier in the multi-link information element in the first message frame may further indicate the listen intervals under other links. More specifically, the corresponding link identifier and the corresponding listen interval information element may be set in the link information field.

The flowchart illustrating the communication method shown in FIG. 2 is only illustrative, and the present disclosure does not limit to this flowchart.

For example, the communication method shown in FIG. 2 may further include, in response to the station supporting multi links executing an operation with an enhanced multi-link single radio communication (EMLSR), communicating, under one link for executing the operation, based on listen interval information of the one link. Due to a fact that the non-AP STA MLD of the EMLSR may only communicate under a single link at a certain time point, the STA corresponding to the single link may periodically awake according to the corresponding listen interval under the link, to communicate with the AP MILD, such as receive a beacon frame sent by the corresponding AP of the AP MLD.

For example, the communication method shown in FIG. 2 may further include, in response to the station supporting multi links executing an operation with an enhanced multi-link multi radio communication (EMLSR), communicating, under multi links for executing the operation, based on respective pieces of listen interval information of the multi links. Due to a fact that the non-AP STA MILD of the EMLSR may communicate under multi links at a certain time point, the STA corresponding to each link in the multi links may periodically awake according to the listen interval under the corresponding link, to communicate with the corresponding AP of the AP MILD, for example, receive each beacon frame sent by the corresponding AP of the AP MLD.

Figure 4:
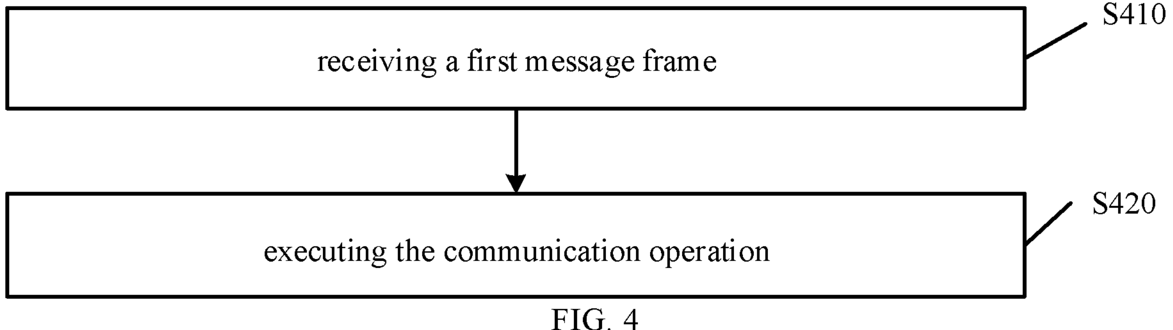
FIG. 4 is a flowchart illustrating a communication method according to another embodiment.

FIG. 4 is a flowchart illustrating a communication method according to another embodiment. The communication method illustrated in FIG. 4 may be applicable for an access point supporting multi links.

As illustrated in FIG. 4, at step S410, a first message frame may be received. The first message frame may include first information. For example, the first message frame may be received under a first link in multi links. According to an embodiment, the first information may be configured to indicate listen interval information of a station corresponding to at least one link in multi links. The listen interval information is configured to define a time interval for the station to awake for a communication operation. Similar to the embodiment described with reference to FIG. 2, the first message frame may be an association request frame or a re-association request frame.

According to an embodiment, the first information may include a listen interval field. The listen interval field may indicate listen interval information of a station corresponding to the first link.

In an embodiment of the present disclosure, the listen interval field may further indicate listen interval information of stations corresponding to other links different from the first link in the multi links. That is, in this case, the first information may be at an MLD level. The listen interval field carried by the first message frame may not only identify the listen interval information under the present link (the first link), but also identify the listen interval information under other links at the same time. As an example, the listen interval information may be a multiple of a maximum value in beacon frame broadcast periods of associated access points, the associated access points being set up, under the multi links, by the station supporting multi links. The first message frame and the listen interval field herein may be similar to the embodiments described above with reference to FIG. 2 and Table 1. For simplicity, repeated descriptions are omitted herein.

In another embodiment of the present disclosure, the first information may further include a multi-link information element. The multi-link information element may include listen interval information of stations corresponding to other links different from the first link in the multi links. According to an embodiment, the multi-link information element may further include a first identifier. The first identifier may indicate that a link information field of the multi-link information element comprises the listen interval information of the stations corresponding to other links. According to an embodiment, the first identifier may be a bit in a multi-link control field, a common information field, a per-station control field, or a complete profile sub field in the multi-link information element. According to an embodiment, the listen interval information may be carried in the multi-link information element in a format of an information element. In other words, in this case, the first information may be at a link level. The listen interval field in the first message frame may be used to identify the listen interval under the current link (first link) for sending the first message frame. The first identifier in the multi-link information element in the first message frame may indicate the listen intervals under other links. More specifically, the corresponding link identifier and the corresponding listen interval information element may be set in the link information field. The listen interval field, the multi-link information, the first identifier, and the listen interval information elements herein may be similar to the embodiment described above with reference to Table 2, Table 3, and FIG. 3. For simplicity, repeated descriptions are omitted herein.

At step S420, the communication operation may be executed based on the first message frame. For example, a feedback response frame for the first message frame may be sent to complete setting up of multi-link communication.

The communication methods illustrated in FIG. 2 and FIG. 4 may identify the listen intervals corresponding to multi links, meeting requirements of a multi-link communication environment and enhancing a utilization of frequency spectrum.

Figure 5:
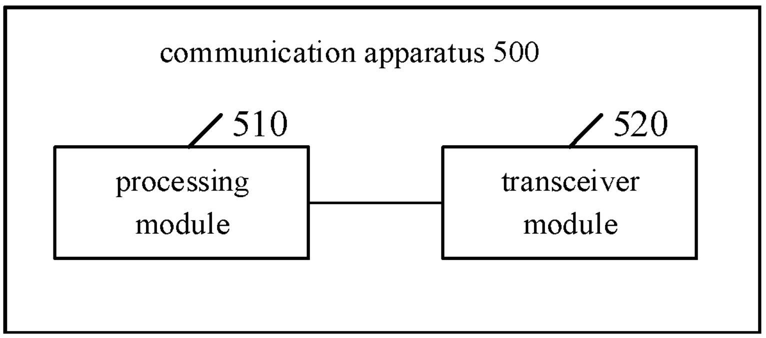
FIG. 5 is a block diagram illustrating a communication apparatus according to an embodiment.

FIG. 5 is a block diagram illustrating a communication apparatus according to an embodiment.

Referring to FIG. 5, the communication apparatus 500 may include a processing module 510 and a transceiver module 520. The communication apparatus illustrated in FIG. 5 may be applicable for a non-AP STA MLD or an AP MLD.

In a case where the communication apparatus illustrated in FIG. 5 is applicable for a station supporting multi links (non-AP STA MILD), the processing module 510 is configured to determine a first message frame. The first message frame may include first information. According to an embodiment, the first information may be configured to indicate listen interval information of a station corresponding to at least one link in multi links, and the listen interval information may be configured to define a time interval for the station to awake for a communication operation. The transceiver module 520 may be configured to send the first message frame based on the first link under the multi links. In this case, the communication apparatus 500 may execute the communication method described with reference to FIG. 2. For simplicity, repeated descriptions are omitted herein.

In a case where the communication apparatus illustrated in FIG. 5 is applicable for an access point supporting multi links (AP MILD), the transceiver module 520 may be configured to receive a first message frame. The first message frame includes first information. According to an embodiment, the transceiver module 520 may receive the first message frame under a first link in multi links. According to an embodiment, the first information may be configured to indicate listen interval information of a station corresponding to at least one link in multi links, and the listen interval information is configured to define a time interval for the station to awake for a communication operation. The processing module 510 may be configured to execute the communication operation based on the first message frame. In this case, the communication apparatus 500 may execute the communication method described with reference to FIG. 4. For simplicity, repeated descriptions are omitted herein.

In addition, the communication apparatus 500 shown in FIG. 5 is only illustrative, and embodiments of the present disclosure are not limited to this embodiment. For example, the communication apparatus 500 may further include other modules, such as a memory module, etc. In addition, respective modules in the communication apparatus 500 can be combined into a more complex module or divided into more individual modules.

The communication apparatus according to embodiments of the present disclosure may identify the listen intervals corresponding to multi links, meeting requirements of a multi-link communication environment and enhancing a utilization of frequency spectrum.

Based on a same principle as the method provided in embodiments of the present disclosure, an embodiment of the present disclosure also provides an electronic device. The present disclosure includes a processor and a memory. The memory stores machine readable instructions (also known as "a computer program"). The processor is configured to execute the machine readable instructions to implement the method described with reference to FIG. 2 and FIG. 4.

An embodiment of the present disclosure also provides a computer readable storage medium. The computer readable storage medium has a computer program stored thereon. The computer program implements the method described with reference to FIG. 2 and FIG. 4 when executed by a processor.

In an illustrative embodiment, the processor may be used to implement or execute various logical blocks, modules, and circuits described in combination with the context of the present disclosure, for example, may be a central processing unit (CPU), a general-purpose processor, a digital signal processor (DSP), an application specific integrated circuits (ASIC), a field programmable gate array (FPGA) or any other programmable logic device, a transistor logic device, a hardware component, or any combination thereof. The processor may also be a combination of implementing computing functions, such as a combination including one or more microprocessors, a combination of DSP and a microprocessor, etc.

In an example embodiments the memory may be, for example, a ROM (read only memory), a RAM (random access memory), an EEPROM (electrically erasable programmable read only memory), a CD-ROM (compact disc read only memory), or other optical disk storage media, optical disc storage media (including a compressed optical disc, a laser disc, an optical disc, a digital universal optical disc, a Blu-ray disc, etc.), a magnetic disk storage media or other magnetic storage devices, or any other medium that can be used to carry or store program codes in the form of instructions or data structures and can be accessed by a computer, but is not limited to these examples.

It should be understood that although steps in the flowchart in the accompanying drawings are displayed sequentially according to arrows, these steps are not necessarily executed in an order indicated by the arrows. Unless explicitly stated in the disclosure, there is no strict order limit for execution of these steps, which can be executed in other order. In addition, at least a portion of the steps in the flowchart in the accompanying drawings may include multiple sub steps or stages, which may not necessarily be completed at a same time point, but may be executed at different time points, and their execution order may not necessarily be sequential, but may rotate or alternate with at least a portion of other steps or sub steps or stages of other steps.

Although the present disclosure has been illustrated and described with reference to certain embodiments of the present disclosure, those skilled in the art will understand that the disclosure may make various changes in form and details without departing from the scope of the disclosure. Therefore, the scope of the disclosure should not be limited to embodiments, but should be limited by the accompanying claims and their equivalents.

The invention claimed is:

1. A method for communicating under multi links, applicable for a station supporting multi links, comprising:

determining a first message frame comprising first information, wherein the first information is configured to indicate listen interval information of a station corresponding to at least one link in multi links, and the listen interval information is configured to define a time interval for the station to awake for a communication operation; and sending the first message frame under the first link in the multi links;

wherein the first information is a multi-link device (MLD) level, in a case of the MLD level, respective STAs supported by the station supporting multi links awake for communication based on a same time interval;

the method further comprises:

communicating, under one link for executing an operation with an enhanced multi-link single radio communication (EMLSR), based on listen interval information of the one link, wherein the station supporting multi links executes the operation.

2. The method according to claim 1, wherein the first information comprises a listen interval field;

the listen interval field indicating listen interval information of a station corresponding to the first link.

3. The method according to claim 2, wherein the listen interval field further indicates listen interval information of stations corresponding to other links different from the first link in the multi links.

4. The method according to claim 2, wherein the first information further comprises: a multi-link information element, the multi-link information element comprising listen interval information of stations corresponding to other links different from the first link in the multi links.

5. The method according to claim 4, wherein the multi-link information element further comprises a first identifier, wherein the first identifier indicates that a link information field of the multi-link information element comprises the listen interval information of the stations corresponding to other links.

6. The method according to claim 5, wherein the first identifier is a bit in a multi-link control field, a common information field, a per-station control field, or a complete profile sub field in the multi-link information element.

7. The method according to claim 4, wherein the listen interval information is carried in the multi-link information element in a format of an information element.

8. The method according to claim 7, further comprising:

in response to the station supporting multi links executing an operation with an enhanced multi-link multi radio communication (EMLSR), communicating, under multi links for executing the operation, based on respective pieces of listen interval information of the multi links.

9. The method according to claim 1, wherein the listen interval information is in units of the maximum beacon interval value of associated access points, the associated access points being set up, under the multi links, by the station supporting multi links.

10. A method for communicating under multi links, applicable for an access point supporting multi links, comprising:

receiving a first message frame comprising first information, wherein the first information is configured to indicate listen interval information of a station corresponding to at least one link in multi links, and the listen interval information is configured to define a time interval for the station to awake for a communication operation; and executing the communication operation based on the first message frame;

wherein the first information is a multi-link device (MLD) level, in a case of the MLD level, respective STAs supported by the station supporting multi links awake for communication based on a same time interval;

the method further comprises:

communicating, by an access point corresponding to one link for executing an operation with an enhanced multi-link single radio communication (EMLSR), with a station corresponding to the one link, based on listen interval information of the one link, wherein the station supporting multi links executes the operation, under the one link for executing the operation.

11. The method according to claim 10, wherein the first information comprises a listen interval field;

the listen interval field indicating listen interval information of a station corresponding to the first link.

12. The method according to claim 11, wherein the listen interval field further indicates listen interval information of stations corresponding to other links different from the first link in the multi links.

13. The method according to claim 11, wherein the first information further comprises: a multi-link information element, the multi-link information element comprising listen interval information of stations corresponding to other links different from the first link in the multi links.

14. The method according to claim 13, wherein the multi-link information element further comprises a first identifier, wherein the first identifier indicates that a link information field of the multi-link information element comprises the listen interval information of the stations corresponding to other links.

15. The method according to claim 14, wherein the first identifier is a bit in a multi-link control field, a common information field, a per-station control field, or a complete profile sub field in the multi-link information element.

16. The method according to claim 13, wherein the listen interval information is carried in the multi-link information element in a format of an information element.

17. An electronic device, configured to implement the method according to claim 10.

18. The method according to claim 10, wherein the listen interval information is in units of the maximum beacon interval value of associated access points, the associated access points being set up, under the multi links, by the station supporting multi links.

19. An electronic device, comprising a memory, a processor, and a computer program stored on the memory and operable on the processor, wherein, when executing the computer program, the processor is configured to;

determining a first message frame comprising first information, wherein the first information is configured to indicate listen interval information of a station corresponding to at least one link in multi links, and the listen interval information is configured to define a time interval for the station to awake for a communication operation; and sending the first message frame under the first link in the multi links;

wherein the first information is a multi-link device (MLD) level, in a case of the MLD level, respective STAs supported by the station supporting multi links awake for communication based on a same time interval;

the processor is configured to:

control the station supporting multi links to communicate, under one link for executing an operation with an enhanced multi-link single radio communication (EMLSR), based on listen interval information of the one link, wherein the station supporting multi links executes the operation.

* * * * *